United States Patent [19]
Thaler

[11] Patent Number: 5,820,092
[45] Date of Patent: Oct. 13, 1998

[54] MODULAR ASSEMBLY KIT FOR CONSTRUCTING ROOF MOUNTED SUPPORT STRUCTURES

[76] Inventor: Ken Thaler, 32-33 Maple Wood Drive, R.R.# 1, Parry Sound, Ontario, Canada, P2A 2W7

[21] Appl. No.: 808,073

[22] Filed: Feb. 28, 1997

[51] Int. Cl.⁶ .................................................... F16M 1/00
[52] U.S. Cl. .......................... 248/237; 248/676; 211/189
[58] Field of Search ............................ 182/151; 248/237, 248/558, 670, 68.1, 357, 370, 676; 211/175, 189, 207; 52/39; 403/374, 409.1

[56] References Cited

U.S. PATENT DOCUMENTS

| | | | |
|---|---|---|---|
| 991,736 | 5/1911 | Minnick | 248/68.1 X |
| 3,028,135 | 4/1962 | Funderburg . | |
| 3,037,593 | 6/1962 | Webster . | |
| 3,327,657 | 6/1967 | Hauville | 211/189 X |
| 3,513,606 | 5/1970 | Jones . | |
| 3,563,504 | 2/1971 | Gordon | 248/68.1 |
| 4,138,094 | 2/1979 | Thir . | |
| 4,657,442 | 4/1987 | Krings | 248/558 X |
| 4,660,799 | 4/1987 | Butland . | |
| 4,989,826 | 2/1991 | Johnston, Jr. . | |
| 5,067,685 | 11/1991 | Johnston, Jr. . | |
| 5,308,037 | 5/1994 | Gonzalez . | |
| 5,664,757 | 9/1997 | Simonis | 211/189 X |

*Primary Examiner*—Ramon O. Ramirez
*Assistant Examiner*—Long Dinh Phan
*Attorney, Agent, or Firm*—Mark Kusner

[57] ABSTRACT

The invention provides a modular assembly kit for constructing a roof mounted support structure, for supporting air conditioners, ductwork, pipes, stacks, lighting and the like. The kit includes standard modular components which can be easily cut to length on site or adapted to any desired configuration with a minimum of preplanning. Each prefabricated module has interconnecting flanges and grooves for joining adjacent modules together in a slidable joint. The slidable joints facilitate positioning of modules during assembly, and set screws releasably lock the sliding joint producing a releasable moment resisting rigid connection between adjacent modules. The modules of the kit include post modules of adjustable height, elongate beam modules of uniform cross-section, and elongate transverse brace modules of adjustable length, and optionally pipe support saddles and beam support brackets. All modules have mating interconnecting flanges and grooves to enable simple assembly and disassembly.

10 Claims, 10 Drawing Sheets

MODULAR ASSEMBLY KIT FOR CONSTRUCTING ROOF MOUNTED SUPPORT STRUCTURES

TECHNICAL FIELD

The invention is directed to a modular assembly kit having a plurality of prefabricated modules which can be releasably interconnected to construct a roof mounted support for a structure, such as an HVAC unit, ducts, walkways, and pipes.

BACKGROUND OF THE ART

The roofs of commercial and industrial buildings are very often used to support mechanical heating and air conditioning equipment, ducts, pipes, raised access walkways, window washing gantries and other structures.

The supplier of a standard mechanical unit may supply a support structure or the installer may custom fabricate the required supports for such structures. Pipes, ducts and electrical wiring may be supported with any number of different support structures by different contractors.

The end result may be a cluttered mismatch of support structures, however, since few people usually see or use the roof area, this has not generally been considered as a significant problem. A building owner may set specifications for construction in order to maintain a standard of quality, however due to changes in practices over time, consistency is difficult to maintain. When the roofing of a building is to be repaired or replaced, quite often these various roof supports cause difficulties, since different sized flashing must be custom fabricated to accommodate the different arrangements.

Conventional responses to this problem have been partially successful in providing modular assemblies which are used to construct the required supports. The advantages of using prefabricated modules are many. Costs can be significantly reduced through mass production, however, provision must be made for adjustments on site and for different sizes of equipment.

Examples of modular roof mounting systems to mount simple box structures of varying widths and lengths are described in the following U.S. Pat. Nos. 5,067,685 and 4,989,826 to Johnston, Jr.; 5,308,037 to Gonzalez; 4,660,799 to Butland; and 3,028,135 to Funderburg, Jr.

The disadvantage of using such systems is that they are not easily adaptable to support the wide array of roof mounted structures commonly specified. This lack of versatility leaves the installer in the position of purchasing a prefabricated support for the major mechanical units, while still custom fabricating the supports required for all ancillary ducts, pipes, walkways etc. The building owner is also disadvantaged since they cannot specify from conventional systems a common available standardized support system. The prior art modular systems are complex, relatively expensive and do not meet the needs of installers or owners for versatility of design.

DISCLOSURE OF THE INVENTION

The invention provides a versatile modular assembly kit for constructing a roof mounted support for any type of structure, such as an HVAC unit, ducts, walkways, and pipes. The kit enables on-site custom assembly from mass produced standard components. The kit includes: a plurality of prefabricated modules, each module having at least one connecting surface; and interconnecting means, disposed on each connecting surface, for joining adjacent modules together in a slidable joint thus facilitating positioning of modules during assembly of said support, and for releaseably locking said sliding joint thus producing a releasable moment resisting rigid connection between connecting surfaces of said adjacent modules. Preferably the interconnecting means are of aluminum extruded sections with mating longitudinal flanges and grooves; and releasable locking means for preventing relative longitudinal displacement between mating flanges and grooves. The locking means may simply include a set screw threaded in one said section and engageable with the other section.

The modular assembly kit of the invention includes standardized mass produced modules which can be rapidly assembled on site, or are easily adapted for prefabrication. Stock lengths of beams, combined with standard prefabricated post modules and supports are used to adapt the system for any required roof mounting arrangement.

Adjustments are provided in the height of posts. The width or length of members can be cut to suit on site or adjustable threaded ends can provide flexibility. An infinite variety of shapes and sizes of supports can thus be assembled from stock lengths of modular extrusions and prefabricated adjustable modules.

All components are joined together with standard sized sliding connections. Interlocking flanges and grooves are provided, for example by using extruded aluminum sections to fabricate various sliding connections.

The sliding connections produce significant benefits. For example, sliding connections allow a supporting structure to be trial fitted in position before completing the support. Set screws or other locking means produce a rigid finished connection and stable structure, without cross braces or tie backs. The provision of rigid moment resisting connections simplifies installation and adds flexibility to the design process by freeing up maximum space within the support structure. The sliding connections also allow easy disassembly of the support for maintenance, renovations, or reroofing.

By using standardized modular components, the specification of roof mounting supports can be simplified. Standard modules that are readily available can be replaced easily, and extension of an existing support system is facilitated. The building owner can standardize all roof supports for a building or group of buildings during construction and reap the benefits of simple maintenance, renovation and repair. Where modifications to a premises are common, such as in automobile manufacturing premises, the removal of old equipment and installation of new equipment is greatly simplified.

Although not preferred, the assembly kit may be easily combined with existing supports and conventional assembly methods. The sliding modular connections, extruded beams and prefabricated modules can be adapted in combination with standard angles, channels, etc. used conventionally to produce a hybrid support structure.

All components of the kit are preferably made of corrosion resistant materials such as extruded or spun aluminum, stainless steel, galvanized steel, rubber, and plastic.

Further details of the invention and its advantages will be apparent from the detailed description and drawings included below.

BRIEF DESCRIPTION OF THE DRAWINGS

In order that the invention may be readily understood, several preferred embodiments of the invention and variations thereof will be described by way of example, with reference to the accompanying drawings wherein:

FIG. 5 shows a small gauge flanged slider support;

FIG. 6 shows a sliding adaptor to connect large and small gauge flanges;

FIG. 7 shows an elongate beam with four longitudinal sides: two with flanges to connect with small gauge flanges; one to connect with large gauge flanges; and one side with no flanges, a flat midportion and two lateral grooves.

FIG. 8 chows an upper leg with a car plate, having: a central groove and two edge flanges.

FIG. 11 is a perspective view showing a pipe support saddle welded to a transverse small gauge flanged slider support of the type shown in FIG. 5;

FIG. 12 is a sectional elevation view showing the saddle slideably connected to the cap plate of an upper leg of a post module;

FIG. 13 is a side elevation view showing the saddle slideably connected to the cap plate of an upper leg of a post module;

FIG. 14 is a sectional elevation view showing the pipe saddle on the upper leg of a completely installed post module assembly with base plate, concrete anchor bolts, flashing and roofing materials;

FIG. 15 is a similar assembly mounted with J-bolts to the top chord of an open web steel joist and penetrating through the roof deck, insulation and roofing materials;

FIG. 16 shows two post modules with a transverse beam supported at both ends with an underslung Z-shaped bracket to support a duct or access walkway below the top cap of the post modules;

FIG. 17 shows two post modules with elongate beams connected to their cap plates, with a transverse brace of adjustable width spanning between the beams, and suspending pipes on a transverse angle with threaded rods; and FIG. 18 shows the vertical stacking capability of the modular kit with two parallel transverse beams supporting multiple sliding pipe saddles at different elevations with two adjustable stub post modules between.

DETAILED DESCRIPTION OF PREFERRED EMBODIMENTS

A quick review of FIGS. 1, 14, 16–18 will reveal the versatility of the modular assembly kit of the present invention. For ease of understanding, simple examples of supports which can be constructed will be explained first, then the description will progress to more complex arrangements.

Figure 1:
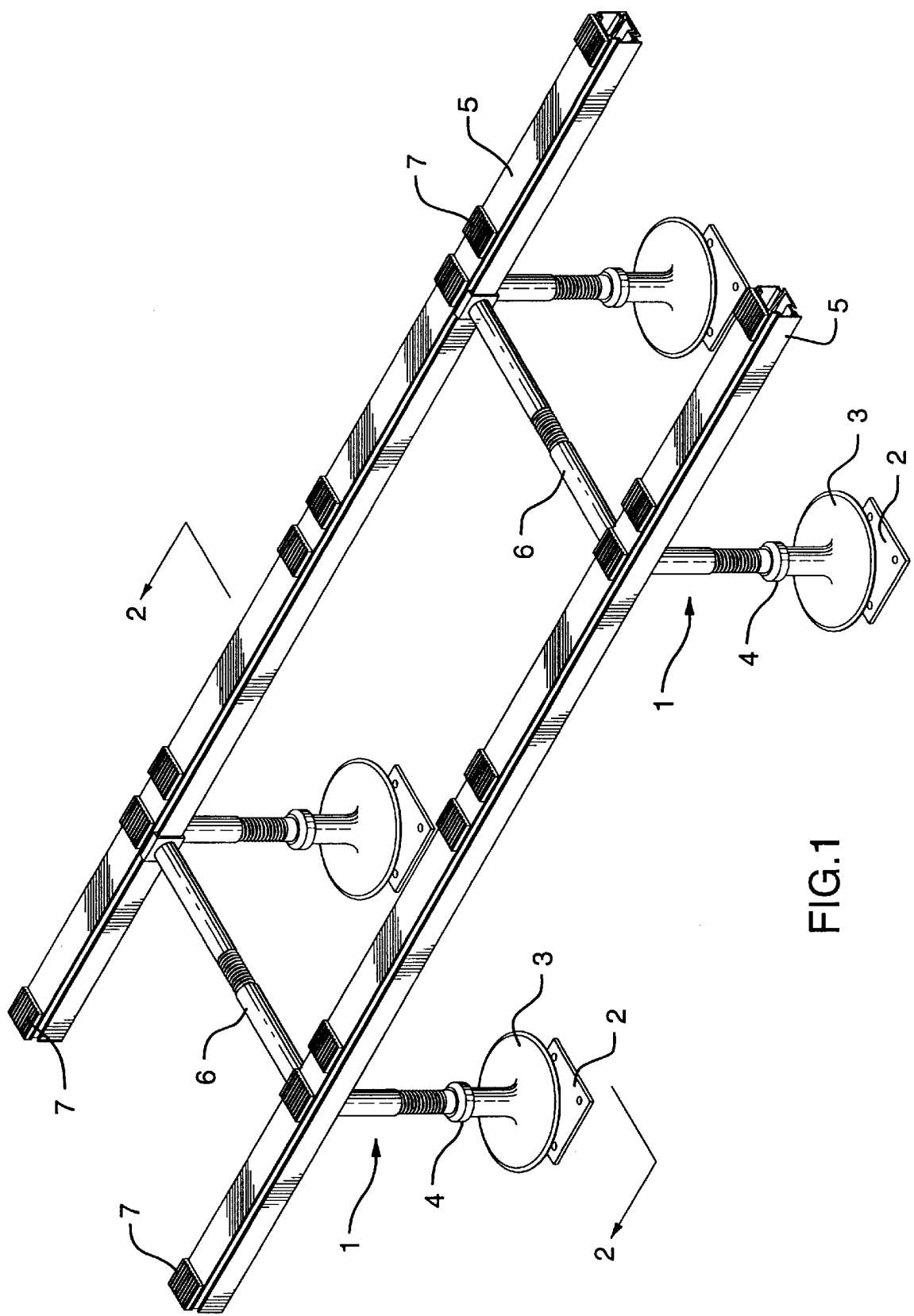
FIG. 1 is a top perspective view of a simple roof mounted support for a rectangular air conditioning unit or similar structure, including: four post modules of adjustable height with flashing and base plates; two elongate support beams of extruded aluminum; and two transverse braces of adjustable width, all rigidly interconnected to each other with sliding flanges and grooves and releasably locked in place with set screws.

With reference to FIG. 1, the illustrated embodiment of the invention shows a simple roof mounted support for a rectangular air conditioning unit or similar box-like structure. The support includes four post modules 1. The post modules 1 have cylindrical mating threaded surfaces to provide an adjustable height for leveling and precise positioning. The post modules 1 have base plates 2 which rest on the roof (not shown in FIG. 1) and include slideable flashing 3 with rubber grommets 4.

Figure 2:
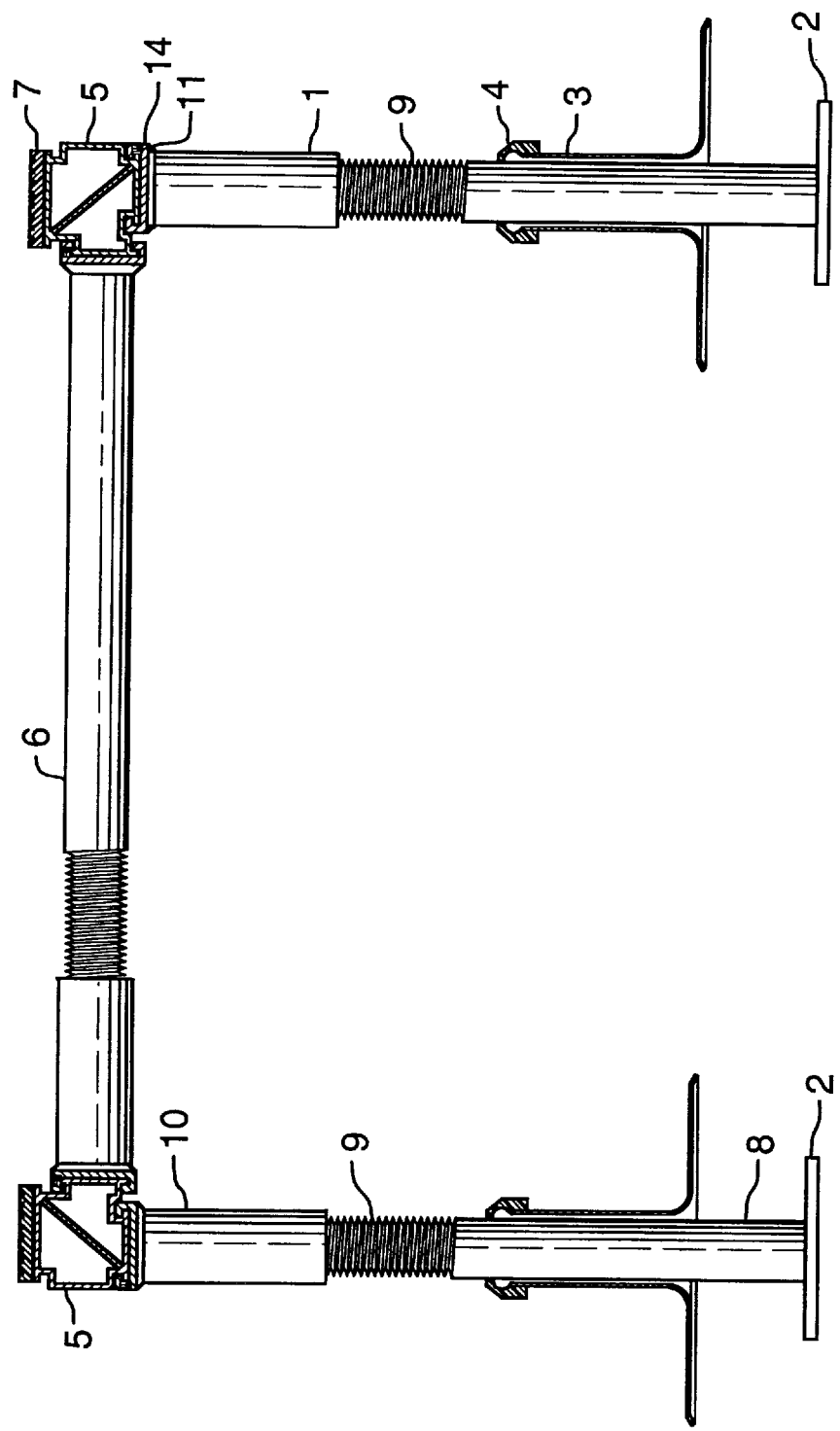
FIG. 2 is an elevation sectional view along line 2—2 of FIG. 1.
Figure 3:
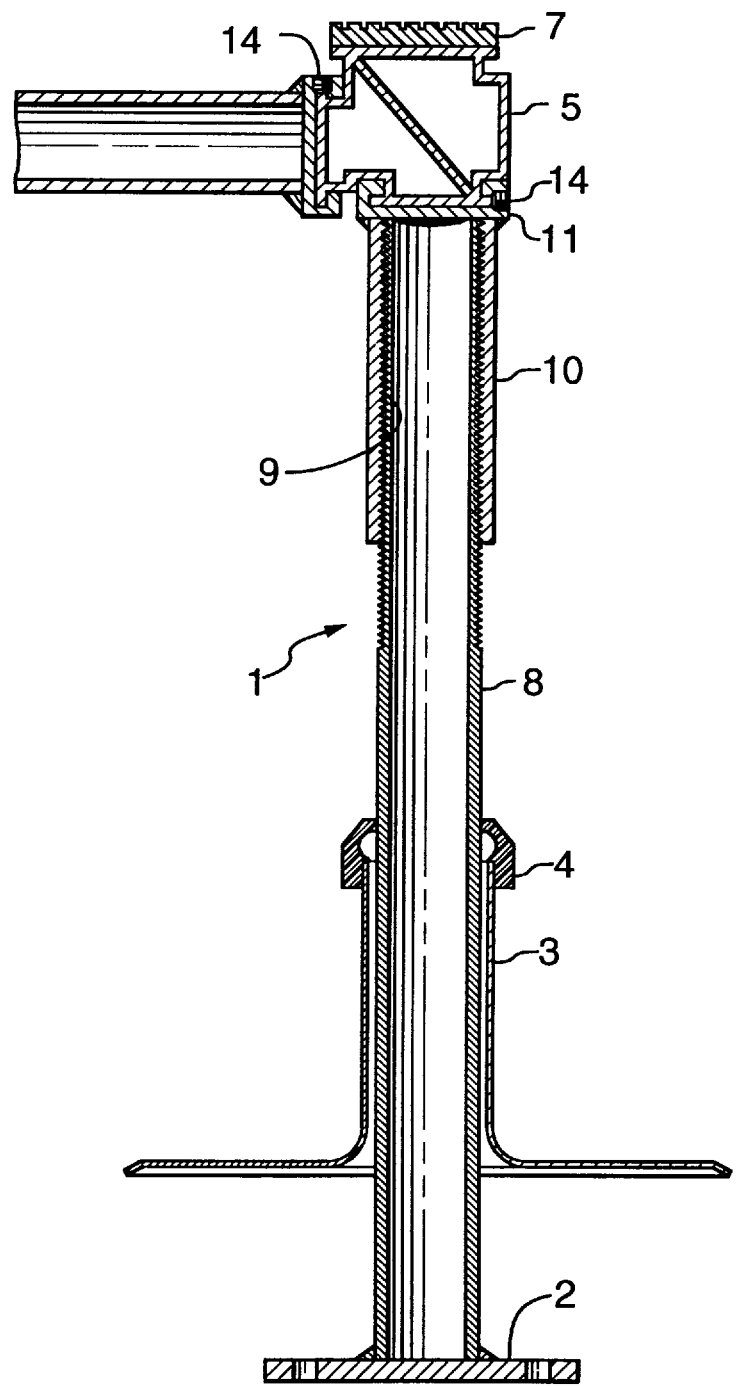
FIG. 3 is a detail view of the left post module and beam of FIG. 3.
Figure 4:
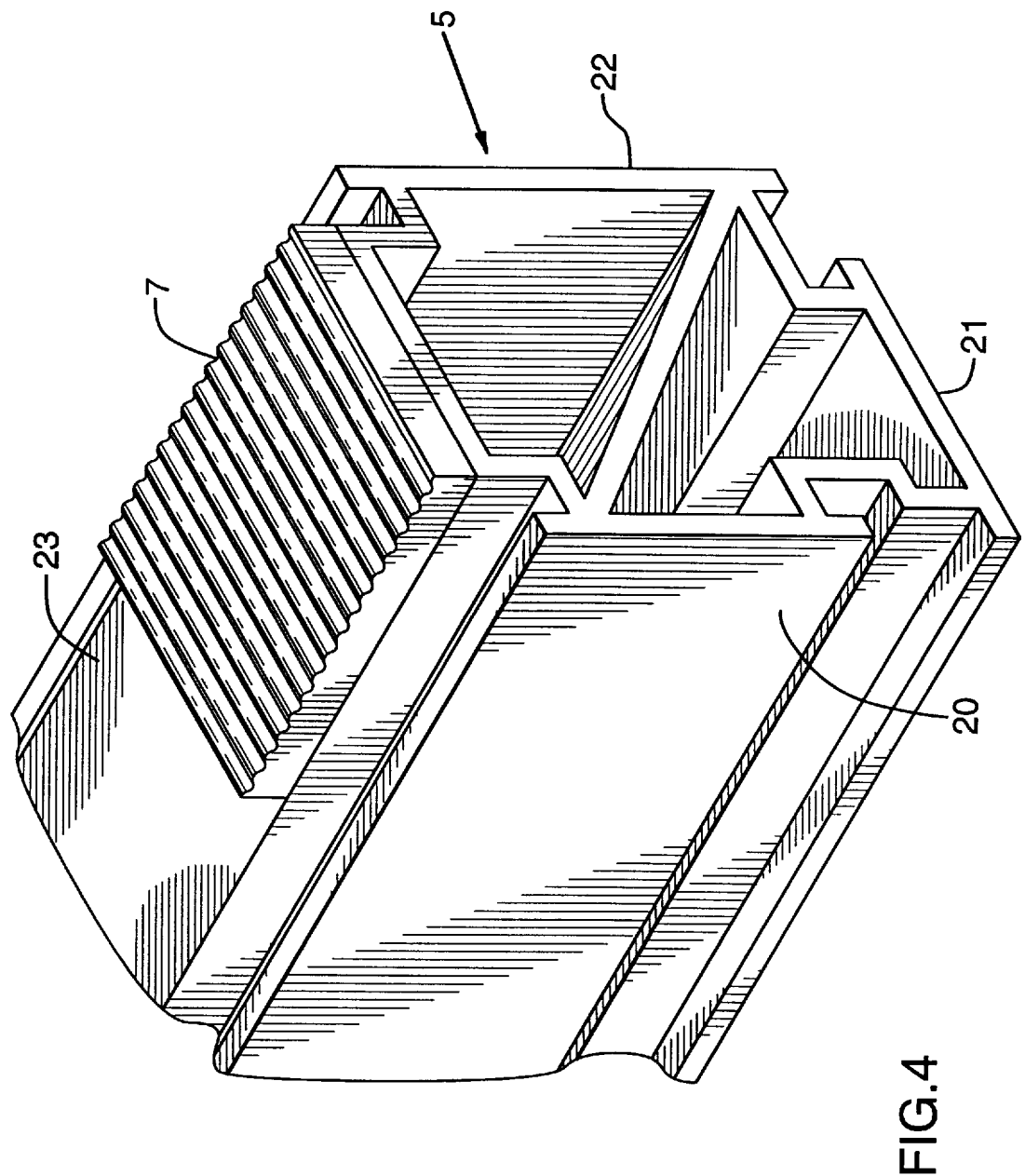
FIG. 4 is a perspective section detail view of the preferred elongate support beam clearly showing the longitudinal flanges and grooves to interconnect various modules together (note that the beam in FIG. 4 is rotated axially 90 degrees clockwise from the beam shown in FIG. 3)

As more clearly seen in conjunction with FIGS. 2 and 3, the simple support includes two elongate support beams 5 of extruded aluminum; and two transverse braces 6. The braces 6 are also preferably of adjustable width with cylindrical mating threaded surfaces. All modules are rigidly interconnected to each other with sliding flanges and grooves that are releasably locked in place with set screws 14 as explained in detail below. Rubber vibration absorbing pads 7 are provided on the upper side of the elongate beams 5 to support a rectangular air conditioning unit for example.

FIG. 3 shows a post module 1 of adjustable height with a base 2 for securing the post module 1 to the roof. A cylindrical lower leg 8 extends from the base 2 with a top threaded portion 9 best seen in FIG. 2. A hollow cylindrical upper leg 10 has a mating threaded internal surface to provide a limited telescoping height adjustment. Post modules 1 of different diameters and heights provide for various height and load capacity specifications.

The overall scheme of the modular assembly kit is as follows. The modular assembly kit is caused for constructing roof mounted supports for various structures. The kit includes a number of standard prefabricated modules, each module having at least one connecting surface. Interconnecting means are disposed on each connecting surface for joining adjacent modules together in a slideable joint. The slideable joints facilitate positioning during assembly of the support and are releaseably locked when the final assembly is complete. The locking of the slideable joint produces a moment resisting rigid connection between connecting surfaces of adjacent modules. Preferably the interlocking means comprise mating longitudinal flanges and grooves as illustrated in the drawings in the example of mating extruded aluminum sections. Locking means, in the form of a set screw 14 threaded in one section and engageable with the other section for example, provides a simple releasable lock to prevent relative longitudinal displacement between such mating flanges and grooves.

The specific details of a preferred flange and groove interconnecting means between modules is apparent from the assembly shown in FIG. 3, and the individual modules shown in FIGS. 4–8.

Figure 8:
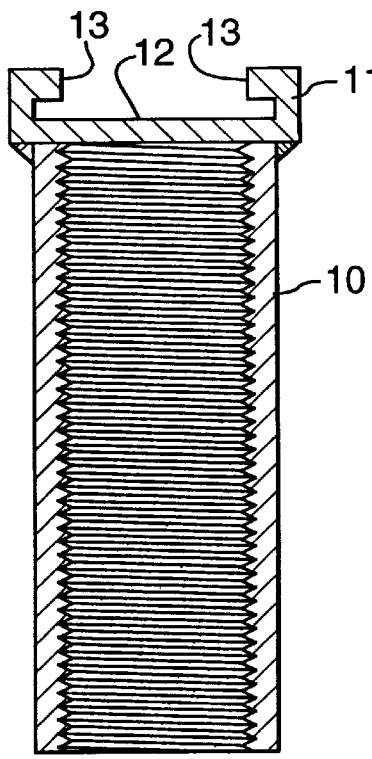

Referring to FIGS. 3 and 8, the upper leg 10 of the post module 1 includes a top connecting surface in the form of a cap plate 11. The cap plate 11 is a short segment of an elongate extruded aluminum section with a central groove 12 and edge flanges 13. As illustrated, the cap plate 11 has flanges 13 spaced apart laterally at a relatively small gauge.

The slideable cap plates 11 of the post modules 1 are used to interconnect with structure support means having a mating sliding connecting surface. As a result, the various roof mounted structures are supported at an adjustable height upon the cap plate 11 of the upper leg 10.

Figure 5:
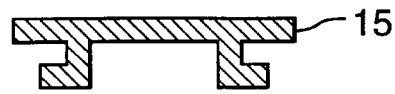
FIGS. 5–8 are sectional views showing the details of interconnecting means between modular components, constructed from elongate extruded aluminum sections, in particular.
Figure 12:
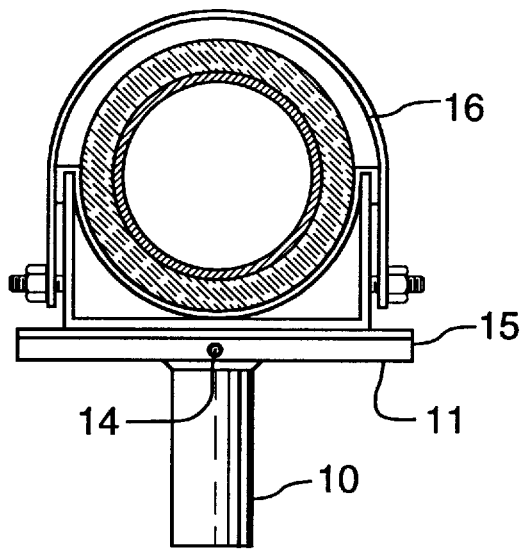
Figure 13:
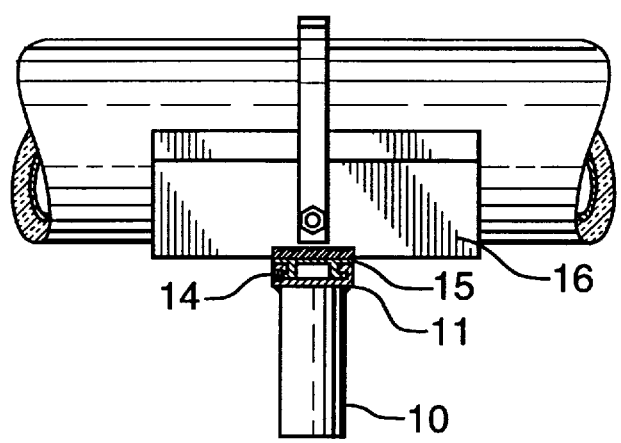

Structure support means can take a variety of shapes depending on the type of structure. For simple mountings and stand supports of pipe structures, the small gauge flanged slider 15 shown in FIG. 5 is used. The T-shaped small gauge profile of the slider 15 fits snugly into the T-shaped groove 12 of the cap plate 1 1. As shown in FIG. 1 1, a simple pipe saddle 16 is welded to a small gauge slider 15. As shown in FIGS. 12 and 13, the welded subassembly is then slideably connected to the cap plate 11 on the upper leg 10, and secured with a set screw 14.

Figures 14, 15:
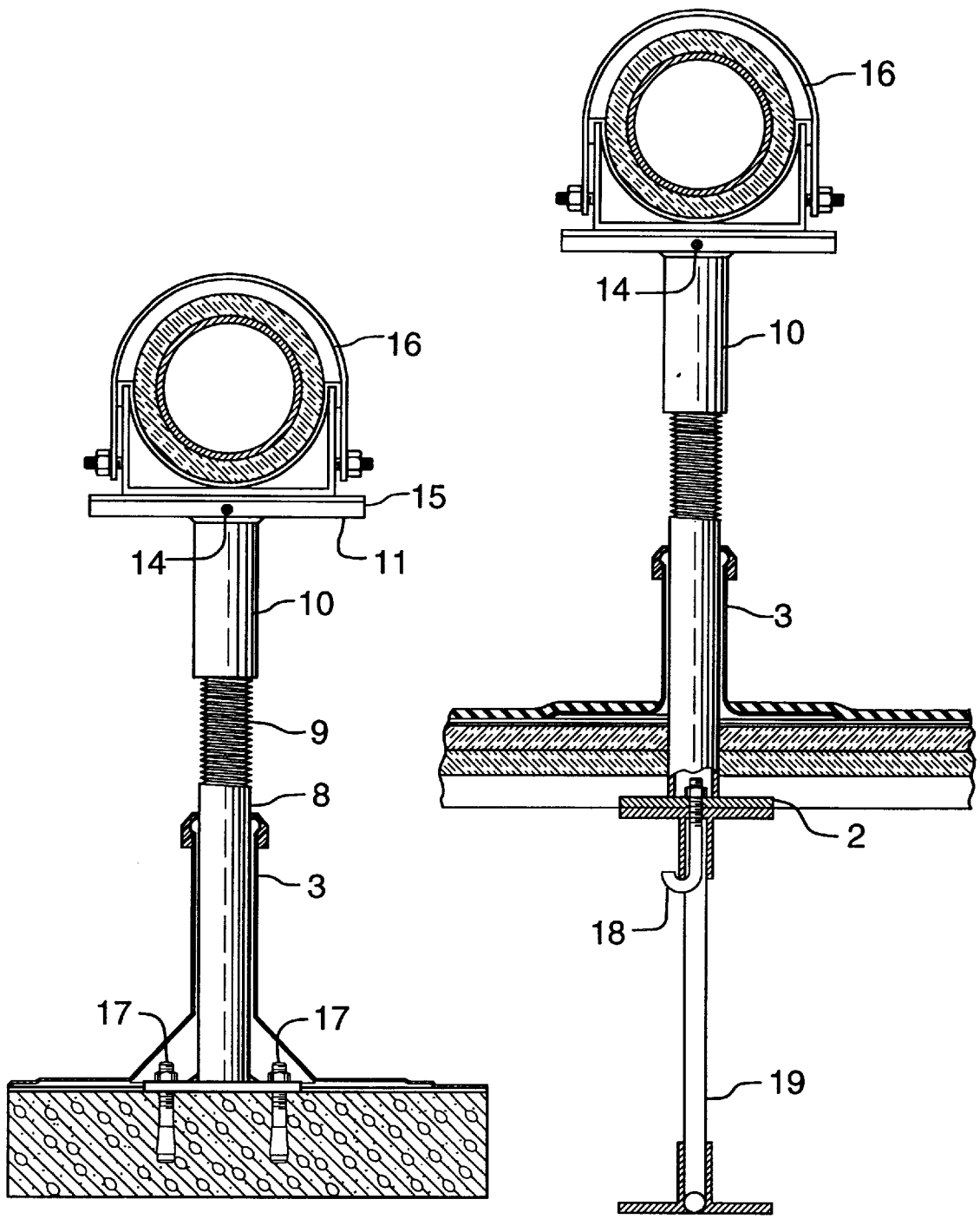

FIGS. 14 and 15 show two simple stand supports for pipe structures completely installed on a roof. The assembled upper leg 10 with attached pipe saddle 16 is threaded on the top portion 9 of the lower leg 8. In FIG. 14, the base plate 2 is fastened to a concrete roof slab with expanding anchor bolts 17. In FIG. 15, the base plate 2 is mounted to the top back-to-back angle chord of an open web steel joist 19 with J-bolts 18. In both cases the finished roof includes flashing 3 covering the base plate 2, fasteners 17, 18, and a lower portion of the lower leg 8.

Figure 7:
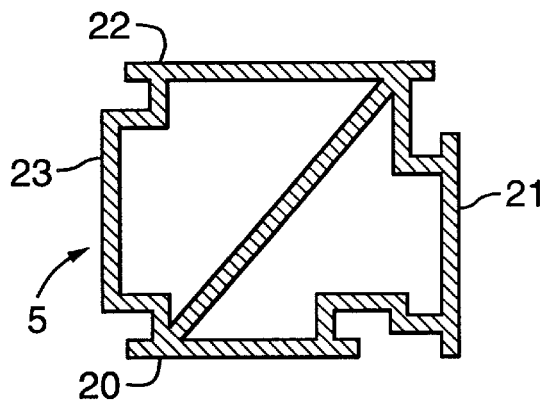

Larger and more complex supports for large mechanical units, ducts, multiple pipe configurations, walkways etc. generally require use of elongate beams 5 mounted to the cap plates 11 of multiple post modules 1. As shown in FIGS. 3, 7 and 8, the elongate beam 5 has a uniform cross section with at least one longitudinal side 20 with a connecting surface having mating small gauge flanges and grooves to slide into the cap plate 11 T-shaped groove 12. Preferably the beam 5 is an extruded aluminum section with small gauge T-shaped flanges formed on two sides 20 and 21 and a large gauge T-shaped flange on a third side 22. This arrangement gives the designer a choice of interlocking different sized sliding modules to the beam 5. The fourth longitudinal side 23 is flat to provide a flush mounting surface as shown in FIG. 1 for example.

Figure 6:
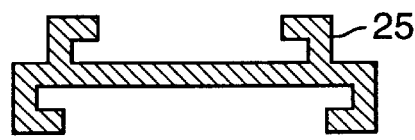
Figure 9:
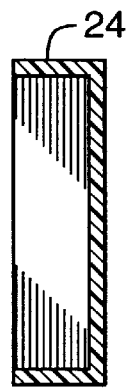
FIG. 9 shows a transverse sectional view, of a plastic moulded end cap for sealing the ends of the extruded elongate beam, along line 9—9 of FIG. 10.
Figure 10:
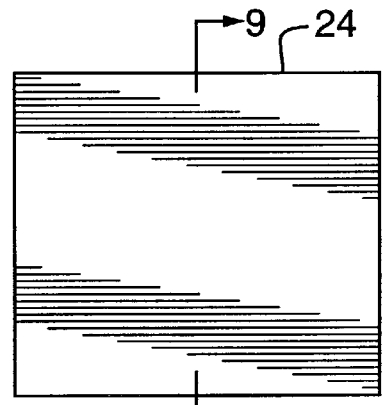
FIG. 10 shows an end view of the plastic moulded end cap.

The square plastic moulded end cap 24 shown in FIGS. 9 and 10 is provided for sealing the ends of the extruded elongate beam 5. The sliding adaptor 25 of FIG. 6 provides additional design flexibility in enabling mounting of small and large gauge modules together easily.

With the above described standard modules, an extremely simple and flexible assembly kit results which can be used to construct a wide variety of complex supports for roof mounted structures.

Figure 16:
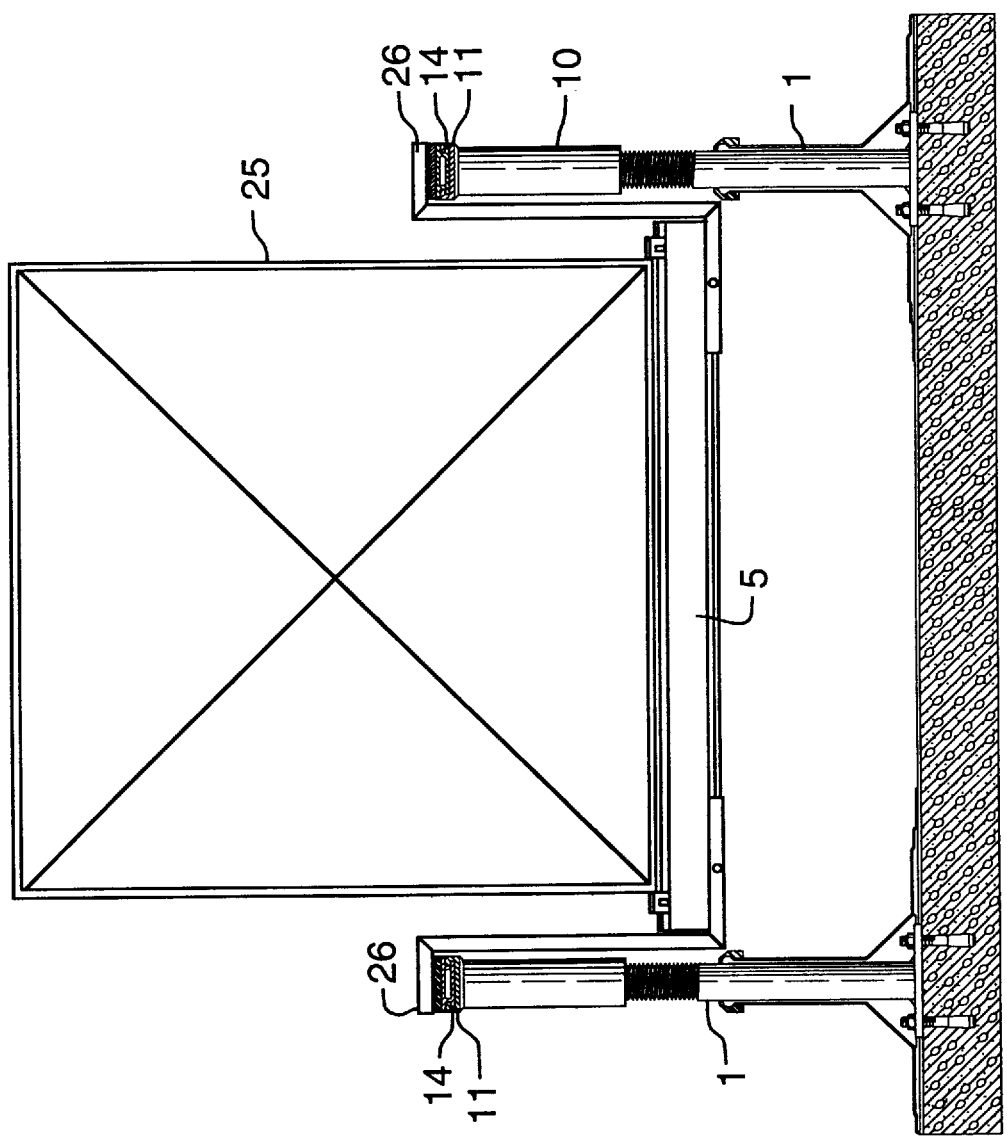
FIGS. 16–18 illustrate different roof mounted supports assembled from modular components of the kit, with added specialized modules, in particular.

The arrangement shown in FIG. 16 can be used to construct a walkway with grating or planking extending between beams 5 or to support the large duct 25 as illustrated. In this application a beam 5 spans between two post modules 1. The beam 5 is attached at both ends to a Z-shaped underslung bracket 26 for hanging the beam 5 below the cap plates 11 of each post module 1. The bracket 26 includes a small gauge slider section 15 which slideably connects with the cap plate 11 and is rigidly locked in place with a set screw 14.

The arrangement shown in FIG. 1 uses two post modules 1 for each of two bents, each with a transverse brace 6 of adjustable length spanning between the beams 5 mounted on top of the post modules 1. The brace 6 has slideable small gauge-connections on both ends and comprises first and second portions joined in a releasable telescoping threaded joint to provide adjustable length to the brace 6.

Figure 17:
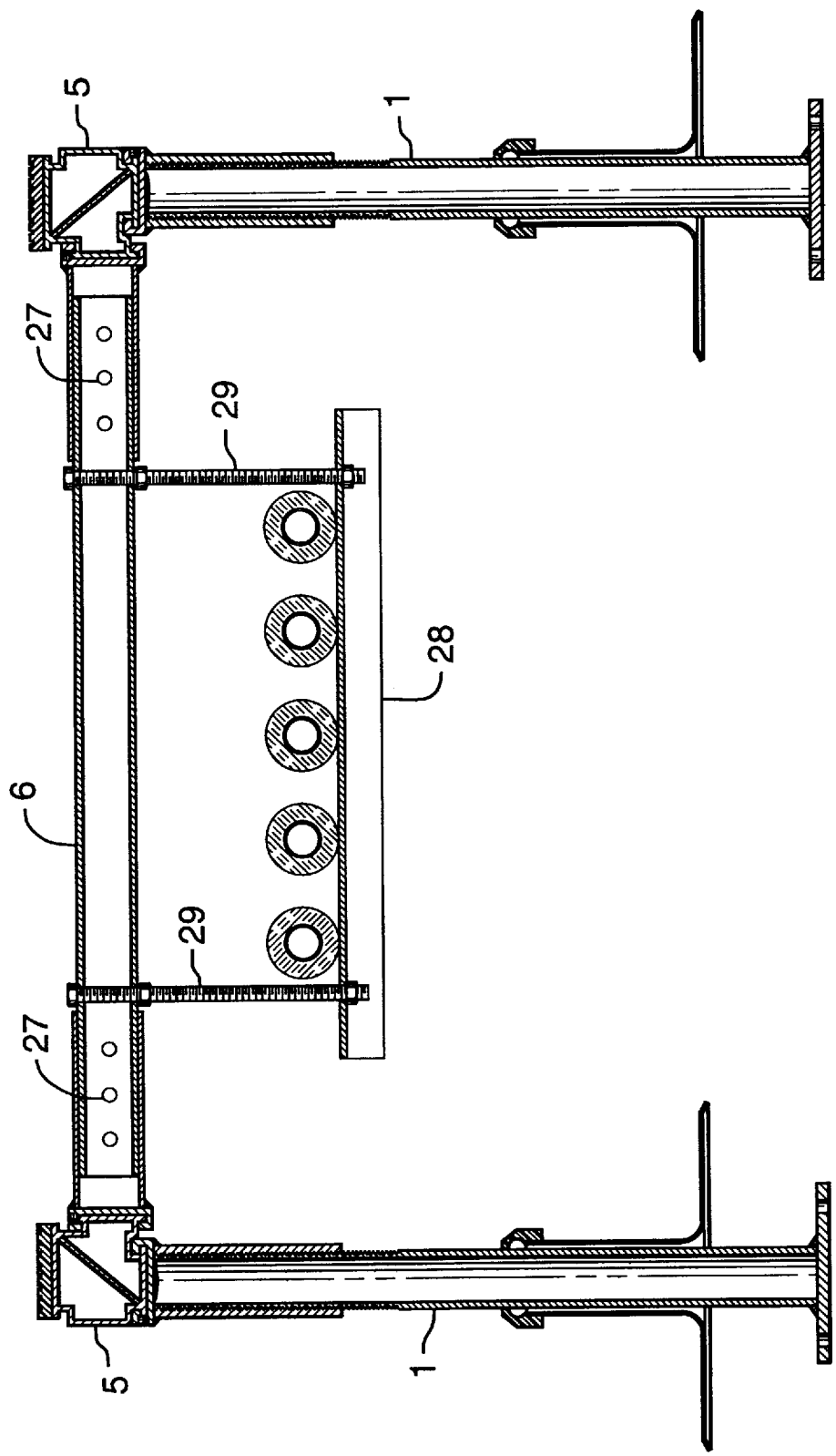

The arrangement of FIG. 17 shows two post modules 1 with elongate beams 5 connected to their cap plates 11. A transverse brace 6 of adjustable width spans between the beams 5. In the brace illustrated, bolt holes 27 are used to secure the telescoping brace sections at the desired adjustable length. The brace 6 suspends pipes on a transverse angle 28 with threaded stainless steel rods 29.

Figure 11:
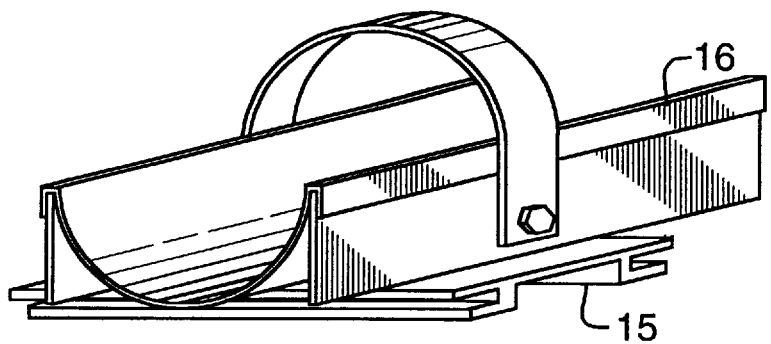
FIGS. 11–15 show details of a simple pipe support structure assembled from modular components of the kit, in particular.
Figure 18:
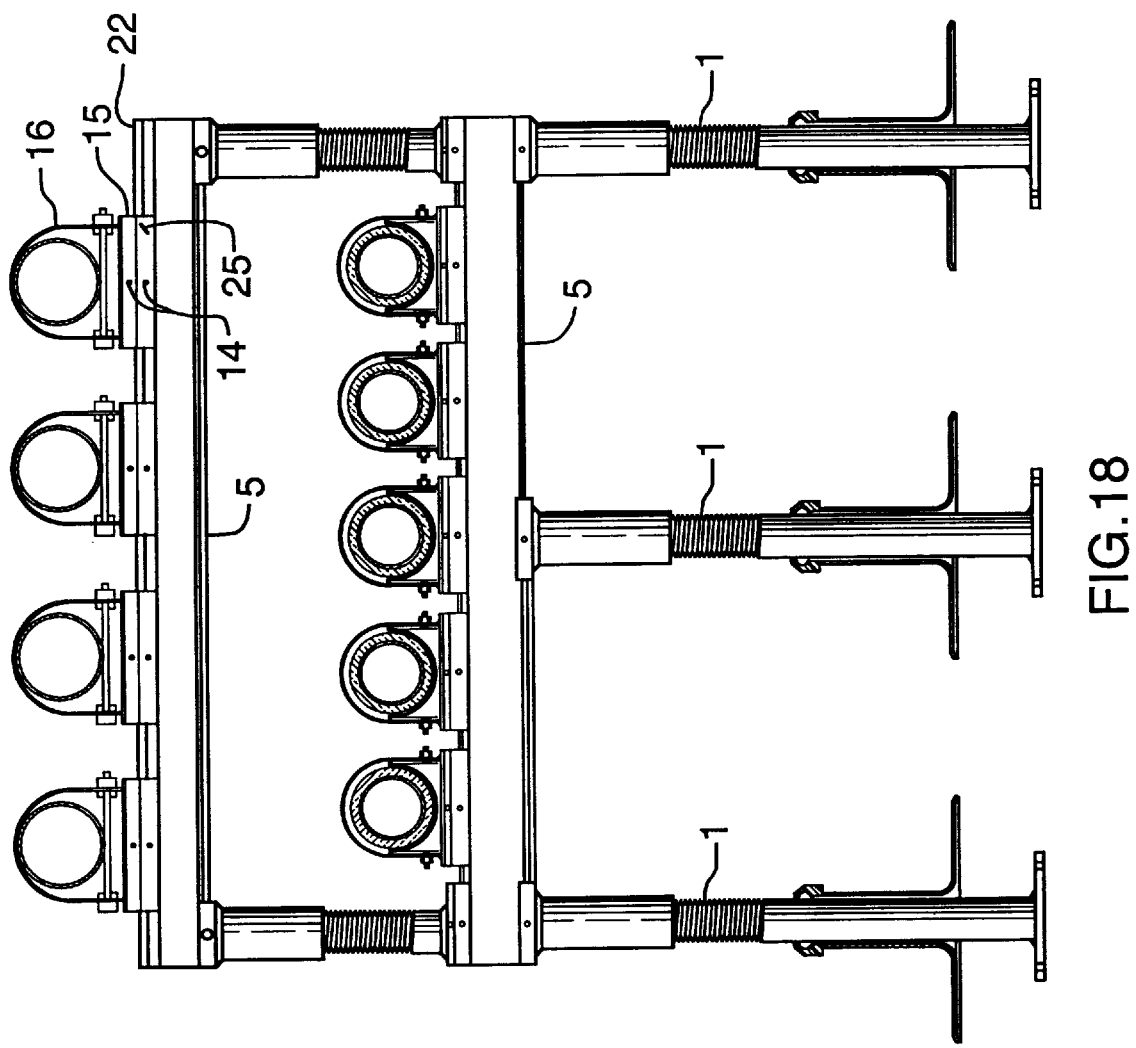

FIG. 18 shows the vertical stacking capability of the modular kit and use of a middle post module 1 for increased load support. Two parallel transverse beams 5 support multiple sliding pipe saddles 16 at different elevations with two adjustable stub post modules 29 between. The saddles 16 include a small gauge slider 15 arranged as shown in FIG. 11, together with a short section of the adaptor 25 (shown in FIG. 6) to mount the saddles 16 to the large gauge T-shaped shaped flange on the third side 22 of the beams 5.

Although the above description and accompanying drawings relate to specific preferred embodiments as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A modular assembly kit for constructing a roof mounted support structure, the kit comprising:
  a plurality of prefabricated modules, each of said modules having interconnecting means for joining adjacent modules together in a slidable joint thus facilitating positioning of modules during assembly, and for releasably locking said sliding joint thus producing a releasable moment resisting rigid connection between adjacent modules, said interconnecting means comprised of mating elongate flanges and grooves; and releasable locking means for preventing relative longitudinal displacement between said flanges and grooves;
  said modules of the kit comprising:
  a) a post module comprising:
    a base;
    roof mounting means for securing the base to a roof structure;
    a lower leg extending from the base;
    an upper leg having said interconnecting means disposed thereon; and
    telescoping post means for releasably adjustably joining said lower leg to said upper leg;
  b) an elongate beam module of uniform cross-section with a plurality of lateral surfaces each having said interconnecting means, and
  c) an elongate transverse brace module comprising first and second brace portions with telescoping brace means for releasably adjustable joining said first brace portion to said second brace portion, and having an end with said interconnecting means disposed thereon.

2. A kit according to claim 1 wherein the interconnecting means comprise first and second mating extruded aluminum sections.

3. A kit according to claim 2 wherein the locking means comprise a set screw having a screwshank threaded in said first section and having a forward end engageable with said second section.

4. A kit according to claim 1 wherein the telescoping post means comprise cylindrical mating threaded surfaces on the upper and lower legs.

5. A kit according to claim 1 wherein the telescoping brace means comprise cylindrical mating threaded surfaces on the first and second brace portions.

6. A kit according to claim 1 wherein the post base includes a base plate and fasteners selected from the group consisting of concrete anchor bolts, and open web steel joist mounting J-bolts.

7. A kit according to claim 6 including flashing means for covering the base, fasteners and a lower portion of the lower leg.

8. A kit according to claim 1 further comprising:
   a pipe support module comprising a pipe supporting saddle with a support surface having said interconnecting means disposed thereon.

9. A kit according to claim 1 further comprising:
   a beam support bracket module having a first and second end each having said interconnecting means disposed thereon.

10. A modular assembly kit for constructing a roof mounted structure, said kit comprised of:
   a) at least one post module, said post module comprised of a base, roof mounting means for securing said base to a roof structure, a lower leg extending from said base, an upper leg and telescoping means for releasably, adjustably joining said lower leg to said upper leg;

b) at least one elongate beam module of generally uniform cross-section having a plurality of lateral surfaces;

c) an elongate transverse brace module comprised of a first brace portion, a second brace portion and telescoping brace means for releasably, adjustable joining said first brace portion to said second brace portion; and d) interconnecting means on 1) said upper leg of said post module, 2) said lateral surfaces of said beam module and 3) at least one end of said brace module for joining adjacent modules together in a slidable joint, said interconnecting means comprised of mating flanges and grooves, said interconnecting means facilitating positioning of modules during assembly and allowing releasable locking of adjacent modules.

* * * * *